US007503553B2

(12) United States Patent
Brannan et al.

(10) Patent No.: US 7,503,553 B2
(45) Date of Patent: Mar. 17, 2009

(54) UTILITY VEHICLE MOUNTING ASSEMBLY

(75) Inventors: Jack D. Brannan, Columbia, MO (US); Robert J. Wolf, Chariton, IA (US)

(73) Assignee: Astoria Industries of Iowa, Inc., Osceola, IA (US)

( * ) Notice: Subject to any disclaimer, the term of this patent is extended or adjusted under 35 U.S.C. 154(b) by 1065 days.

(21) Appl. No.: 10/412,545

(22) Filed: Apr. 11, 2003

(65) Prior Publication Data

US 2004/0201155 A1 Oct. 14, 2004

(51) Int. Cl.
*B60G 11/14* (2006.01)

(52) U.S. Cl. .................................... 267/286; 267/248

(58) Field of Classification Search ................ 267/249, 267/250, 176, 166, 248, 286, 288, 289, 293
See application file for complete search history.

(56) References Cited

U.S. PATENT DOCUMENTS 2,678,796 A * 5/1954 Roy .......................... 248/613
3,411,806 A * 11/1968 Bellairs ..................... 267/250
3,622,194 A * 11/1971 Bryk ........................ 296/35.1
3,769,774 A * 11/1973 Barnes ....................... 52/698
4,079,926 A * 3/1978 Nunes ....................... 267/166
4,653,796 A 3/1987 Koenig et al.
4,862,983 A 9/1989 Kreft
6,015,176 A * 1/2000 Egan ........................ 396/35.1
6,079,698 A * 6/2000 Patterson et al. ............. 267/33
6,499,714 B1 * 12/2002 Wike ......................... 248/632
6,761,372 B2 * 7/2004 Bryant ................ 280/124.179
6,802,498 B2 * 10/2004 Makino et al. ......... 267/140.13

* cited by examiner

*Primary Examiner*—Thomas J Williams

(57) ABSTRACT

A flexible utility body mount assembly is provided for connecting a utility body to the frame of a utility truck. The mount comprises a frame bracket rigidly attached to the truck frame and a body bracket rigidly attached to the utility body. The frame bracket includes a block and a spacer. A compression element travels through a bore within the block and connects the body and frame brackets. The block limits the lateral movement of the mount. The spacer fits between the utility body and the truck frame and allows for proper alignment between the body and frame brackets. The compression element comprises a bolt, a compression spring and a rebound element such that the compression spring is secured about the bottom side of the block while the rebound element is secured about the top.

9 Claims, 2 Drawing Sheets

UTILITY VEHICLE MOUNTING ASSEMBLY

BACKGROUND OF THE INVENTION

This invention relates to a mounting device and, more specifically, to a device for mounting a truck body to a truck frame.

Utility trucks typically have a channel chassis or frame that spans the length of the truck. A forward cab portion and a rearward utility body are attached to and rest upon the truck frame. Traditionally, the rearward utility body of the truck is attached to the frame by welds between the utility body and the frame or by other conventional rigid attachment means. During movement of the truck, the rigidly attached utility body will move with the truck frame thus experiencing abnormal stresses. For instance, as a utility truck travels over curbs or other uneven surfaces, the utility body will tend to twist with the truck frame, which stresses the body. This twisting action places heightened stresses upon the door openings, latches, and hinges of the utility body. Over time, these stresses degrade the integrity of the body, leading to failure.

Several flexible mounts have been developed that can secure a utility body to a truck frame while resisting the undue stress created by the truck's movement. U.S. Pat. No. 4,862,983 by Kreft, for example, discloses a truck body mount that employs two compression springs. Depending upon the twisting action of the truck frame, the springs will either expand or compress to minimize this motion and absorb the energy that would otherwise be transferred to the fixed portions of the mount.

One disadvantage of conventional flexible mounts is that they do not critically dampen the energy transferred between the utility body and the truck frame during movement of the truck. As the utility body twists about the truck frame during movement of the truck, conventional flexible mounts tend to oscillate vertically, creating a harmonic bounce. As the utility body plunges toward the truck frame, one of the compression springs of a conventional flexible mount will compress while the other compression spring will expand. This energy is not dampened by the springs, but rather transferred back and forth between the two springs, causing the utility body to oscillate vertically about the truck frame.

Another disadvantage of conventional flexible mounts is that they do not adequately limit the flexible motion between the utility body and the truck frame during movement of the truck. Because conventional flexible mounts are held together primarily by a pair of unguided springs, the mount is permitted to travel in any direction that the springs provide. The dual spring system of conventional flexible mounts allows for lateral motion between the utility body and the truck frame as they move up and down, from side to side, or front to back. This virtually unrestrained and unfettered motion contributes to the dampening problem described above.

It is therefore a principal object of this invention to provide a flexible utility body mount that can critically dampen the energy transferred between the utility body and the truck frame during movement of the truck.

A further object of this invention is to provide a flexible utility body mount that can adequately limit the lateral motion between the utility body and the truck frame during movement of the truck.

Yet another object of this invention is to provide a flexible utility body mount that is simple to use and repair and provides these benefits economically.

These and other objects will be apparent to those skilled in the art.

BRIEF SUMMARY OF THE INVENTION

The present invention comprises generally a flexible utility body mount for connecting a utility body to the frame of a utility truck. The mount comprises a frame bracket rigidly attached to the truck frame and a body bracket rigidly attached to the utility body. The frame bracket includes a block and a spacer. A compression element travels through a bore within the block and connects the body and frame brackets.

The block retains the compression element and acts to provide lateral strength to the mount by limiting the side to side and forward to back movement of the mount. The spacer fits between the utility body and the truck frame and allows for proper alignment between the body and frame brackets.

The compression element comprises a nut, bolt, a compression spring and a rebound element such that the compression spring is secured about the bottom side of the block while the rebound element is secured between the frame and the body brackets.

BRIEF DESCRIPTION OF THE DRAWINGS AND PHOTOS

DESCRIPTION OF THE PREFERRED EMBODIMENTS

Figure 2:
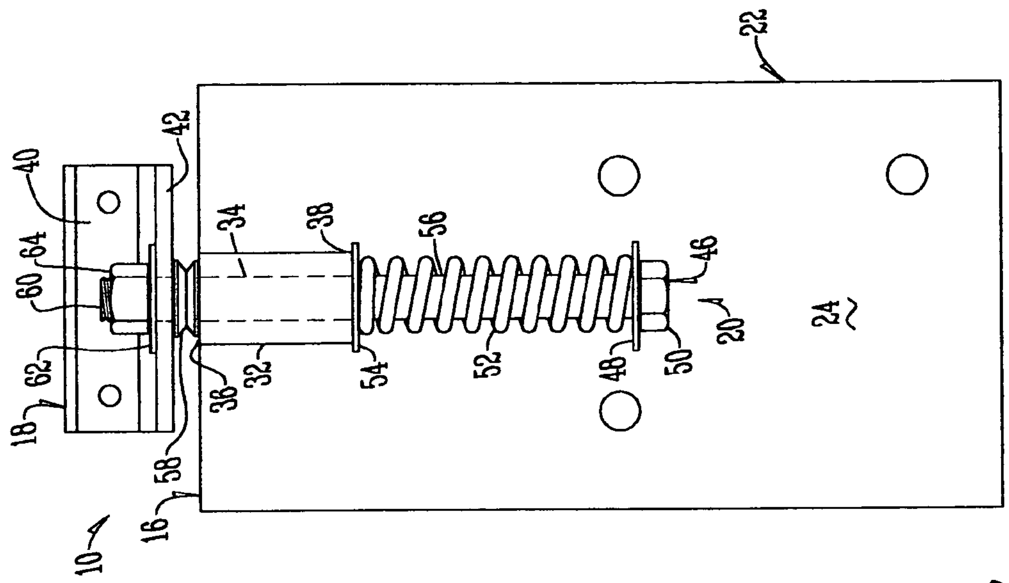
FIG. 2 is a front view of the invention.
Figure 1:
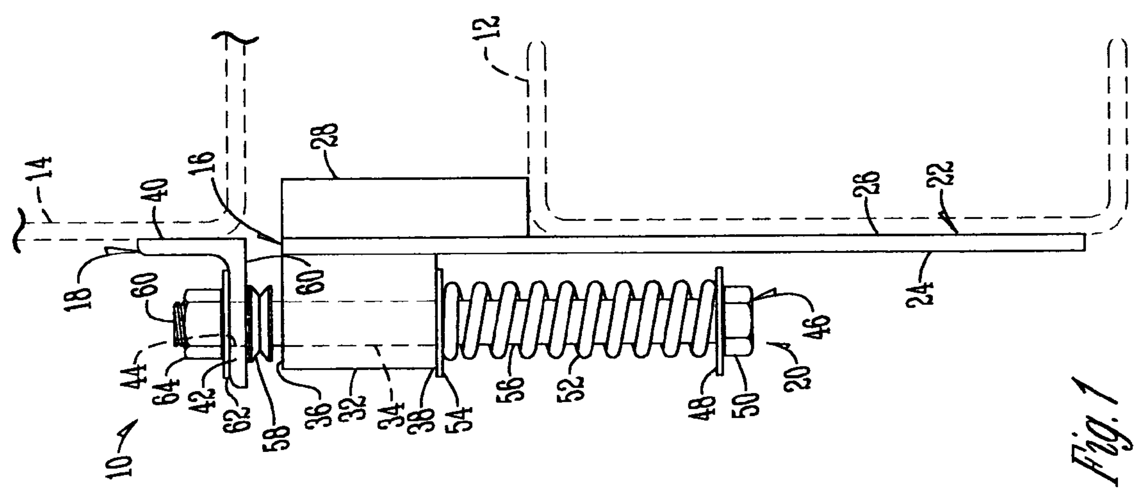
FIG. 1 is a side view of the invention in relation to the vehicle body and frame.
Figure 3:
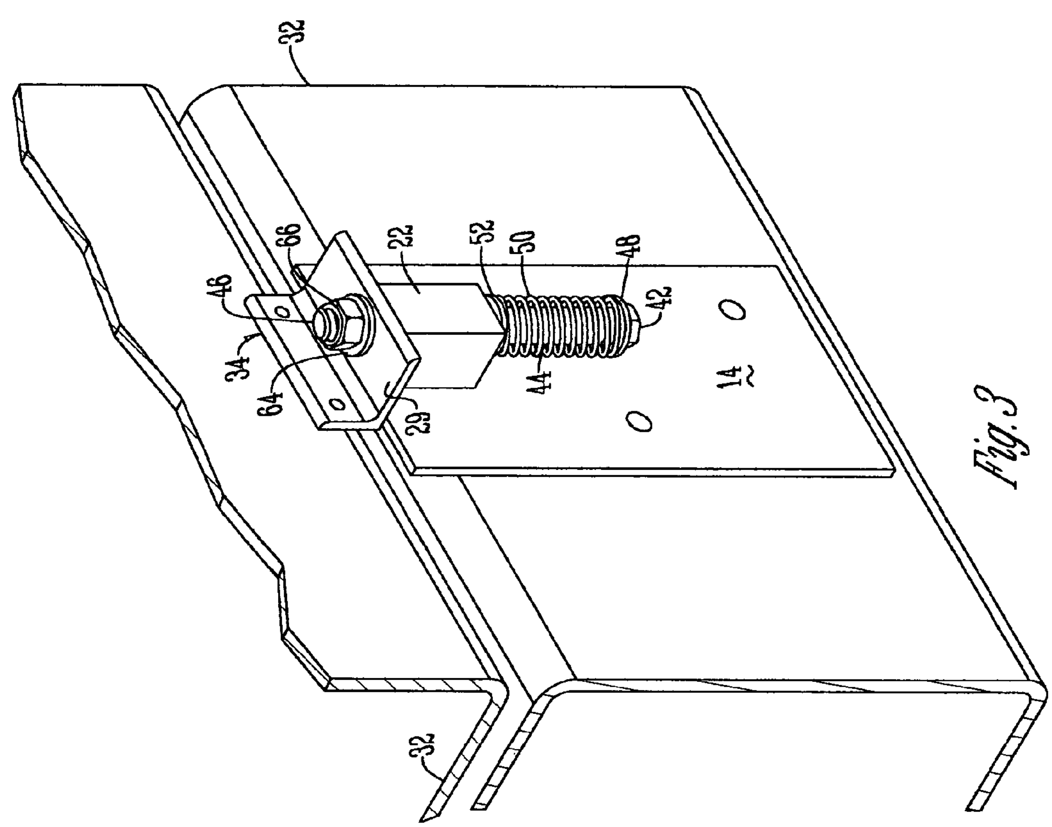
FIG. 3 is a perspective view of the invention.

With reference to FIGS. 1-3, the mounting assembly 10 is used to attach a conventional vehicle frame 12 to a conventional vehicle body 14. The mounting assembly includes a frame bracket 16, a body bracket 18, and a compression element 20. Frame bracket 16 is rigidly attached to the frame 12 and includes a mounting plate 22 with an outward face 24 and an inward face 26. The inward face 26 of mounting plate 22 mates against frame 12 of the truck and is secured in place with bolts. The mounting plate 22 is attached to truck frame 12 with four bolts. Alternatively, mounting plate 22 may be welded to truck frame 12 or attached with any other conventional rigid attachment means. Mounting plate 22 is typically made of carbon steel but may also be made of aluminum or any other alloy, depending upon the material of truck frame 12. To prevent galvanic corrosion, mounting plate 22 should be made of the same material as truck frame 12.

A spacer 28 is secured at the upper end of mounting plate 22, along the inward face 26. Spacer 28 consists of a section of square tubing that is typically welded to the inward face 26 of the mounting plate 22. Spacer 28 should be constructed of the same material as mounting plate 22 and truck frame 12. The purpose of spacer 28 is to provide for proper alignment between frame bracket 16 and body bracket 18. It is preferred that spacer 28 rest on the top side of truck frame 12, as shown in FIG. 1, and that the intersection of the inward face 26 of mounting plate 22 be in the same vertical plane as both the outer sides of the truck frame 12 and truck body 14.

Frame bracket 16 also includes a block 32. Block 32 is secured at the upper end of mounting plate 22, along the outward face 24. Block 32 consists of a rectangular block of material that is welded or otherwise rigidly attached to the outward face 24 of mounting plate 22. Block 32 also has a bore 34 that extends through block 32 from a top end 36 of the block to a bottom end 38 of the block. Block 32 should be constructed of the same material as mounting plate 22 and truck frame 12. The purpose of block 32 is to retain compression element 20, as will be discussed hereinafter.

The mounting assembly 10 also includes a body bracket 18 that is rigidly attached to a body 14 of a utility truck. Body bracket 18 is generally L-shaped and consists of a vertical member 40 and a horizontal member 42. Vertical member 40 rigidly attaches to truck body 14. In the preferred embodiment, vertical member 40 secures to truck body 14 with two bolts. Alternatively, vertical member 40 may be welded to truck body 14 or attached with any other conventional rigid attachment means. Horizontal member 42 has a hole 44 through which to accommodate the compression element 20. Body bracket 18 should be constructed of the same material as mounting plate 22 and truck frame 12.

Compression element 20 serves to connect body bracket 18 and frame bracket 16. Compression element 20 includes a bolt 46 that passes through the bore 34 of the block 32 and the hole 44 in body bracket 18 to hold and retain the components of the compression element 20 as well as connect the body bracket 18 and frame bracket 16.

Specifically, a flat washer 48 is placed on the bolt 46 while in an inverted position such that the washer rests against the head 50 of the bolt 46. A helical compression spring 52 with constant spring diameter is placed on the bolt 46 and rests against a first flat washer 48. A second flat washer 54 is then placed on the bolt, flanking the end of spring 52 opposite the first flat washer 48. The bolt then passes through the bore 34 of block 32 such that second flat washer 54 rests against the bottom end 38 of block 32. Bore 34 has a diameter greater than that of the shaft 56 of bolt 46 such that the bolt 46 can move vertically inside block 32 without restriction. A rebound element 58 is then placed on the bolt 46 such that the rebound element 58 rests against the top end 36 of block 32. It is preferred that the rebound element 58 comprises a pair of Belleville washers. The Belleville washers 58 are stacked one on top of each other in series. That is, the first Belleville washer is placed such that its end of greater diameter sits on the top end 36 of block 32. The second Belleville washer is placed in an opposite orientation as the first such that the ends of smaller diameter of both washers are in contact with each other, as shown in FIGS. 1 and 2. The threaded end 60 of bolt 46 then passes through the hole 44 in the horizontal member 42 of body bracket 18. A third flat washer 62 is placed on the bolt and resides on the top side of horizontal member 42 of body bracket 18. Finally, a nut 64 secures to the threaded end 60 of bolt 46 to retain all of the forementioned components of the compression element 20. The nut 64 is tightened on the bolt 46 sufficiently to retain the components of compression element 20 as well as pre-load the compression spring 52 and rebound element 58 as required by the specific application.

When the utility truck equipped with the mounting assembly 10 is in motion, the utility body 14 may tend to twist about the truck frame 12, especially as the truck travels over curbs or other uneven surfaces. As the utility body 14 twists, it may plunge downward with respect to the truck frame 12. As the utility body 14 plunges downward the body bracket 18 pushes downward on the rebound element 58. Because the truck frame 12 is stationary relative to the utility body 14, the block 32 remains stationary relative to the downward motion of the body bracket 18. The bolt 46 will move downward through the bore 34 inside block 32, causing the rebound element 58 to compress under the load exerted by body bracket 18 onto block 32. The rebound element 58 will deflect sufficiently to absorb this energy.

The twisting action of the utility body 14 about the truck frame 12 may also cause the utility body 14 to lift upward with respect to the truck frame 12. As the utility body 14 moves upward, the body bracket 18 will move upward with respect to a stationary truck frame 12 and stationary block 32. As the body bracket 18 moves upward, it will exert an upward force on the third flat washer 62 and nut 64, thereby lifting bolt 46. As bolt 46 lifts upward relative to a stationary block 32, the head 50 of bolt 46 will exert an upward force on the first flat washer 48 and compression spring 52. Block 32 will exert a normal force on the second flat washer 54 and compression spring 52. The lifting force of the bolt 46 and the normal force of the block 32 will cause the compression spring 52 to compress as necessary to absorb this energy.

In typical operation, the twisting action of the utility body 14 about the truck frame 12 will cause the utility body 14 to both plunge downward and lift upward with respect to the truck frame 12. Because of the rebound element 58, the utility body 14 will not oscillate about the truck frame 12. Rather, the rebound element 58 will critically dampen the vertical motion of the utility body 14 relative to the truck frame 12, preventing a so-called harmonic bounce. Specifically, as the utility body 14 lifts upward, the compression spring 52 will compress as described above. The potential energy stored in spring 52 while in a compressed position will cause spring 52 to eventually expand, which will pull bolt 46 and, ultimately, utility body 14 downward again. As utility body 14 moves downward, rebound element 58 will work to dampen the system and prevent continued oscillation. The reason for this is because the rebound element 58 is considerably stiffer than the compression spring 52. In conventional flexible mount systems, this vertical motion would not be dampened. Rather, the energy absorbed by one compression spring would be transferred to the other compression spring and so forth, causing the utility body to oscillate vertically with respect to the truck frame. Rebound element 58 of the present invention, however, degrades this energy as it attempts to bring the system back to a stable, neutral position.

In typical operation, block 32 works to limit the lateral motion that can be transferred as the utility body 14 twists about the truck frame 12. Bore 34 inside block 32 is large enough in diameter to allow bolt 46 to move vertically without restriction. Block 22, however, retains bolt 46 such that the lateral or side to side as well as front to back motion of bolt 46 will be restricted. This retention of the bolt 46 increases stability in the system and allows the flexible mount to focus on absorbing vertical movement. In conventional flexible mount systems, the body and frame brackets are connected principally by a dual spring system that is not retained by a guide or device similar to the block 32. Because of this, conventional flexible mount systems have a greater range of travel, which reduces the vertical dampening of the dual spring system. Block 32 in combination with compression element 20 adequately limits extraneous motion of the system such that the rebound element 58 can focus on dampening vertical motion.

The performance of the mounting assembly 10 can be adjusted according to the desired needs of the specific application. One parameter that may be adjusted is the response of compression spring 52. The characteristics, including the number of coils, the spring diameter, and the wire diameter, can be altered to vary the spring constant and performance of compression spring 52. Varying the characteristics of compression spring 52 will affect the upward lift of the utility body 14 relative to the truck frame 12. Specifically, increasing the spring constant of compression spring 52 will stiffen the spring and limit the upward motion of the utility body 14.

Another parameter that may be adjusted is the response of the rebound element 58. The ratio of the vertical height of the washer to the thickness of the washer can be altered to vary the load-deflection characteristics and performance of the rebound element 58. Specifically, decreasing the ratio of the vertical height to the thickness of the rebound element 58 will increase the stiffness of the washers, which increases the dampening capacity of the rebound element 58. Additionally, the orientation of the Belleville washers may be changed to vary the load-deflection characteristics and performance of the rebound element 58. Instead of stacking the two washers in series as shown in FIGS. 1 and 2, the rebound element 58 may be nested or placed in parallel. That is, the second washer may be placed on bolt 46 in the same orientation as the first washer such that the second washer nests or sits flush against the first washer. Nesting the rebound element will increase the stiffness of the washers, which increases the dampening capacity of the rebound element 58.

Finally, the characteristics of the block 32 may be adjusted to vary the lateral strength of the present invention. Specifically, the diameter of the bore 34 within block 32 can be varied to adjust the amount of lateral play between the shaft 56 of bolt 46 and the bore 34 of block 32. Further, the height of block 32 may be adjusted to further limit lateral movement.

Whereas the invention has been shown and described in connection with the preferred embodiment thereof, it will be understood that many modifications, substitutions, and additions may be made which are within the intended broad scope of the following claims. From the foregoing, it can be seen that the present invention accomplishes at least all of the stated objectives.

What is claimed is:

1. A mounting assembly to secure a vehicle frame to a vehicle body comprising:

a frame bracket adapted to be secured to a truck frame and having a block fixedly connected to the frame bracket and a vertical bore extending through the block;

a body bracket adapted to be secured to a vehicle body above and in alignment with the frame bracket;

a compression element comprised of a bolt and a compression spring, wherein only a first portion of the bolt extends through the vertical bore of the block to yieldingly connect the frame bracket to the body bracket for vertical movement with respect to each other, wherein an inner diameter of the vertical bore of the block is larger than an outer diameter of the bolt to allow the bolt to move vertically without restriction, and wherein a second portion of the bolt extends through the compression spring; and wherein the body bracket is L-shaped.

2. The mounting assembly of claim 1 wherein the compression element has a rebound element positioned between an upper surface of the block and a lower surface of the body bracket for dampening the vertical motion of the vehicle body relative to the truck frame.

3. The mounting assembly of claim 1 wherein the bolt comprises a bolt head and a longitudinal shaft, wherein the compression spring surrounds the shaft of the bolt and the spring is positioned between the bolt head and the block.

4. The mounting assembly of claim 1 wherein the frame bracket has a spacer extending inwardly and positioned between the vehicle frame and the vehicle body.

5. A mounting assembly to secure a vehicle frame to a vehicle body comprising:

a frame bracket adapted to be secured to a truck frame and having a block fixedly connected to the frame bracket and a vertical bore extending through the block;

a body bracket adapted to be secured to a vehicle body above and in alignment with the frame bracket;

a compression element comprised of a bolt and a compression spring, wherein only a first portion of the bolt extends through the vertical bore of the block to yieldingly connect the frame bracket to the body bracket for vertical movement with respect to each other, wherein an inner diameter of the vertical bore of the block is larger than an outer diameter of the bolt to allow the bolt to move vertically without restriction, and wherein a second portion of the bolt extends through the compression spring, and having a rebound element positioned between an upper surface of the block and a lower surface of the body bracket for dampening the vertical motion of the vehicle body relative to the truck frame,; and wherein the body bracket is L-shaped.

6. The mounting assembly of claim 5 wherein the bolt comprises a bolt head and a longitudinal shaft, wherein the compression spring surrounds the shaft of the bolt and the spring is positioned between the bolt head and the block.

7. The mounting assembly of claim 5 wherein the frame bracket has a spacer extending inwardly and positioned between the vehicle frame and the vehicle body.

8. The mounting assembly of claim 2 wherein the rebound element is comprised of a stacked pair of Belleville washers.

9. The mounting assembly of claim 5 wherein the rebound element is comprised of a stacked pair of Belleville washers.

* * * * *